Nov. 24, 1959

D. F. COLE 2,913,976

ELECTRIC BROILER

Filed Nov. 8, 1957

INVENTOR.
DAVID F. COLE

BY

*Oberlin & Limbach*
ATTORNEYS

INVENTOR.
DAVID F. COLE
BY
Oberlin + Limbach
ATTORNEYS

Nov. 24, 1959

D. F. COLE 2,913,976

ELECTRIC BROILER

Filed Nov. 8, 1957

INVENTOR.
DAVID F. COLE

BY
Oberlin & Limbach
ATTORNEYS

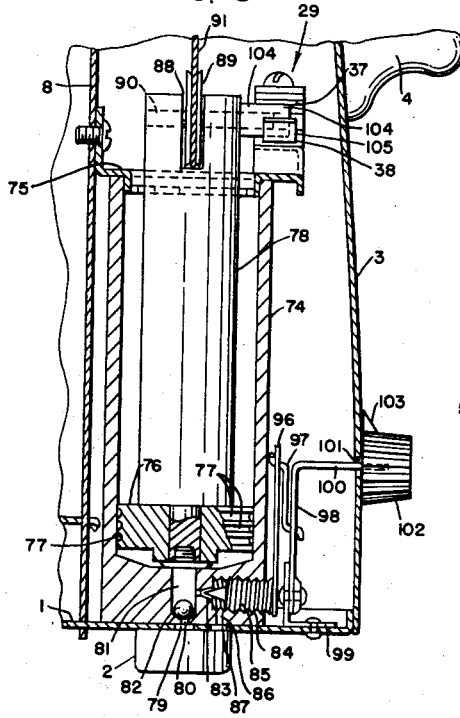

Nov. 24, 1959     D. F. COLE     2,913,976
ELECTRIC BROILER
Filed Nov. 8, 1957     5 Sheets-Sheet 5
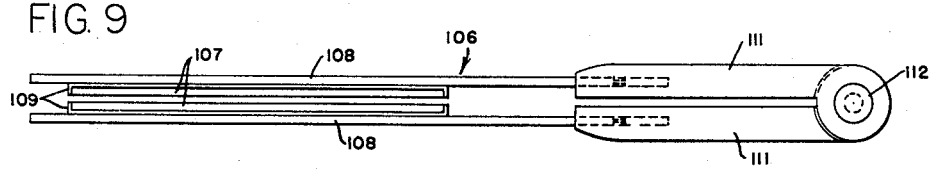
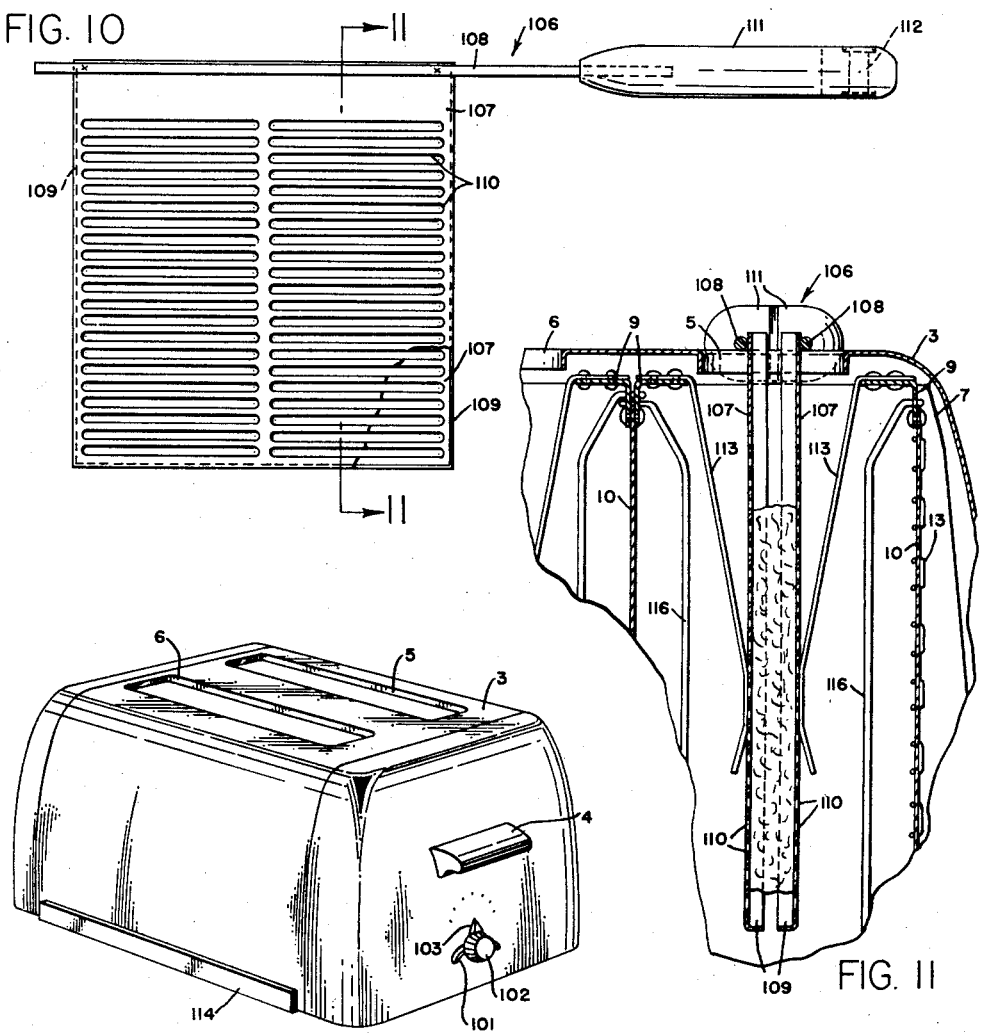
INVENTOR.
DAVID F. COLE
BY
*Oberlin & Limbach*
ATTORNEYS

# United States Patent Office 2,913,976
Patented Nov. 24, 1959

2,913,976
ELECTRIC BROILER
David F. Cole, Mansfield, Ohio

Application November 8, 1957, Serial No. 695,248

12 Claims. (Cl. 99—327)

This invention relates to an electric cooking appliance intended primarily for broiling meat and, more particularly, to a portable device of this nature in which the meat is held vertically between heating elements for simultaneous broiling of both sides, in much the same manner that bread is toasted in present day electric toasters.

The broiling of meat, however, involves a number of special considerations which preclude realization of the same in conventional toaster construction, with perhaps the most obvious departure resulting from the need to employ some form of holder for the meat whereby the same can be handled and supported in proper relation to the heating elements of the device. All such utensils are desirably automatic in the sense of operating for pre-settable periods of time, and the character of the food again and importantly influences the structure with regard to the timing mechanism employed. For example, bread may be toasted in a fairly short interval, so that short cycle, inexpensive timing devices, such as simple thermostatic contactor assemblies, can be used to control the operation. Other foods, and meat in particular, require much longer exposure, with any practical heating means, and the timing for automatic termination cannot be obtained by such simple expedients.

To illustrate the problem further, an electric broiler for meat and the like of a size suitable for household use should be capable of being set for a period up to seven or eight minutes, and the need for timing means having such a comparatively long cycle has not, to my knowledge, been satisfactorily met heretofore in such an appliance. Certain spring and electric motor timers of course could theoretically be used, but long interval timers of such types are much too expensive to be feasible in the production of a reasonably priced utensil of the nature involved.

It is accordingly an important object of my invention to provide in economical and practical construction a time-controllable electric cooker fully capable of broiling meat and other food products the grilling or broiling of which likewise entails heating exposure for a substantial time interval.

Another object is to provide such a broiler which will, for any given time setting, invariably operate on the same cycle, notwithstanding the frequency with which the same may be repeated. That is, the timing cycle is unaffected by temperature changes and other extraneous factors.

A further object of the invention is to provide an electric broiler characterized in the aforenoted respects which utilizes a pneumatic timer of improved form for the adjustable automatic control of its operation.

It is also an object to provide a cooking device in which the food is supported vertically between electric heating elements cooperably by a removable, freely and conveniently openable holder and means in the device precluding improper release by the holder therewithin.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 5 illustrates a portion of such timer in vertical section;

Fig. 6 is a horizontal section of such timer;

Fig. 7 shows another part of the control mechanism in vertical section and to a further enlarged scale;

Fig. 8 is a perspective view of a control sub-assembly;

Fig. 9 is a top plan view of a holder usable with the broiler;

Fig. 10 is a side elevational view of such holder;

Fig. 11 shows such holder sectioned on the line 11—11 in Fig. 10 and inserted in the broiler; and Fig. 12 is a perspective view of the broiler.

Figure 1:
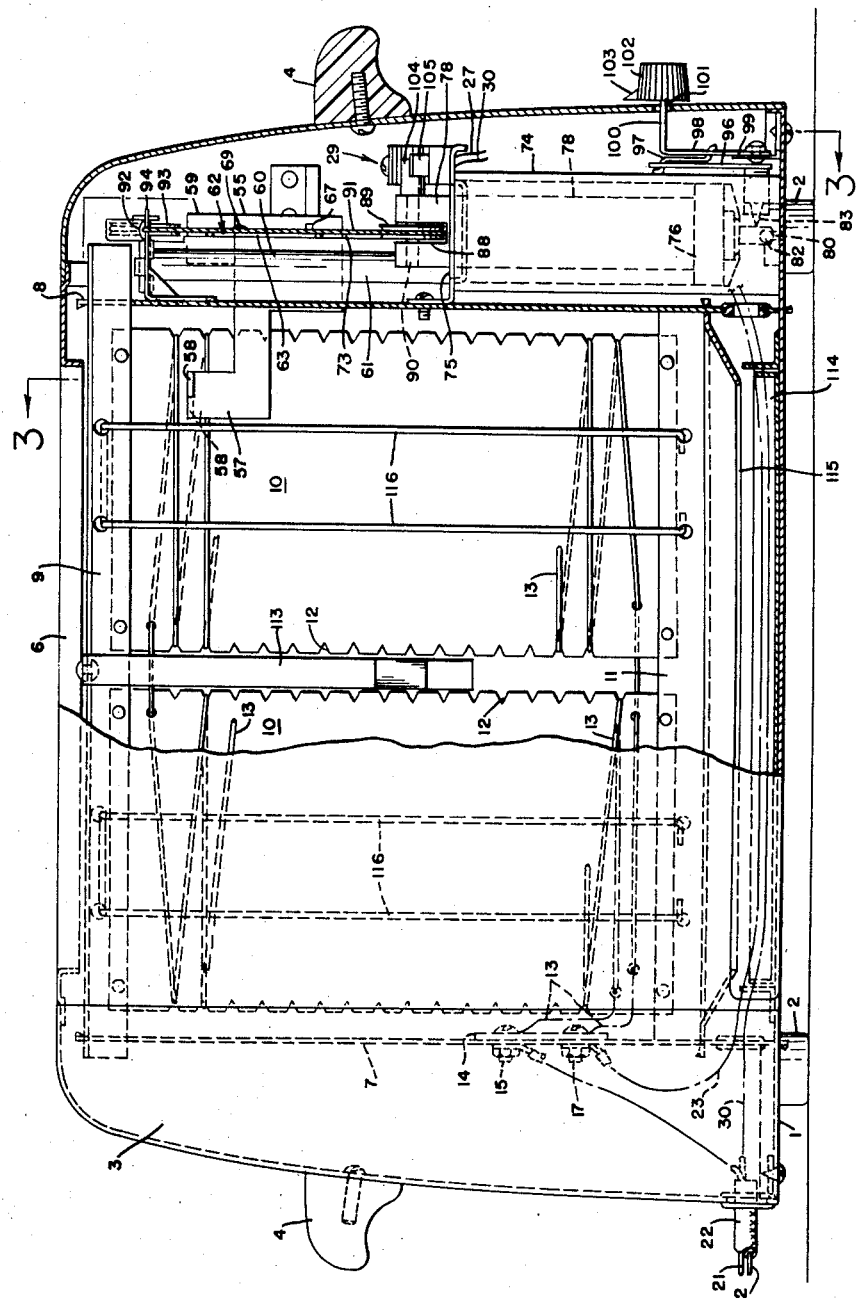
Fig. 1 is a side elevational view of an electric broiler constructed in accordance with the present invention with a portion of the near wall broken away to expose the inner construction.

Referring now to the drawings in detail, the preferred embodiment of the invention shown therein comprises a base 1, carrying short legs 2, and a generally rectangular shell or housing 3 supported on and projecting upwardly from such base. The device is portable, with handles 4 provided at the ends thereof, and the top of the shell is formed with two elongated openings 5 and 6 in spaced parallel relation, such openings or slots permitting insertion of the food as in a conventional toaster.

There are two transverse walls 7 and 8 (Fig. 1) within the shell, in the respective end portions of the same, and a series of four top support angles 9 extend longitudinally between such walls, with two close together beneath that portion of the top wall intermediate the two slots 5 and 6 and the remaining two respectively at the sides just outboard of the outer margins of these slots. The vertical portions of the center angles are in close opposition and secured between the same there are two depending heater support sheets 10, made of insulative heat-resistant material, preferably mica. Two more of such sheets are secured at their top edges to each of the side support angles 9, with the two in each pair being planar and slightly separated longitudinally. The lower ends of these rectangular, vertically arranged sheets are fastened to support strips 11 likewise extending longitudinally between the transverse walls 7 and 8.

Such insulative sheets 10 are serrated as at 12 along their vertical edges and resistance wire 13 (shown interrupted for convenience) is wound thereon in the resulting notches, in general helical fashion. In the arrangement shown, the same heater wire is wound on each pair of side-by-side sheets, so that there are in effect three heating elements, one in the center and one at each side, forming two cooking chambers in the broiler.

These heating elements are connected in parallel to terminals mounted on a board 14 which is in turn secured to the inner transverse wall 7. For convenience of connection, four such terminals 15–18 are provided with, however, the upper two 15, 16 being interconnected by a wire 19 and the lower two 17, 18 similarly bridged by a wire 20; the thus paired terminals thereby form common connectors for the respective ends of the three heating elements 13. The internal wiring is shown schematically so as not to encumber the illustration. Terminal 15 is connected to one wire 21 of a conventional insulated supply cord 22 extending from the broiler and having at its other end a plug (not shown) for connection in a standard outlet. Terminal 18 is connected within the broiler by a wire 23 to a terminal 24 of a first control switch designated generally at 25 and the other terminal 26 of this switch is connected by a further wire 27 to a terminal 28 of a second control switch indicated at 29. A wire 30 extends from the remaining terminal 31 of such second switch to the second wire 32 of the supply conductor 22, so that the two switches are in electric series connection. As shown most clearly in Figs. 3 and 4, the first switch 25 comprises parallel blades 33, 34 carrying opposed contacts 35, 36, respectively, while switch 29 similarly includes blades 37, 38 carrying its contacts 39, 40, the terminals of both switches of course leading conductively to the respective blades.

As indicated previously, the operation of the broiler is adjustably time-controlled and the mechanism provided for such control comprises an operating slide 41 reciprocable along a vertical guide 42 secured centrally to the outboard face of the other transverse wall 8. It will be seen from Figs. 2 and 3, in particular, that the body of such slide has a peripheral flange 43 and is formed with a plurality of rearwardly off-set tabs 44 which engage about flanges 45 of this vertical guide. Further guiding of the slide in its vertical movement is provided by a rod 46 which passes through a circular enlargement 47 in the top center portion of the slide flange, and there is a compression spring 48 encircling such rod and engaging beneath such flange enlargement, the spring resiliently holding the slide in its uppermost position.

Figure 2:
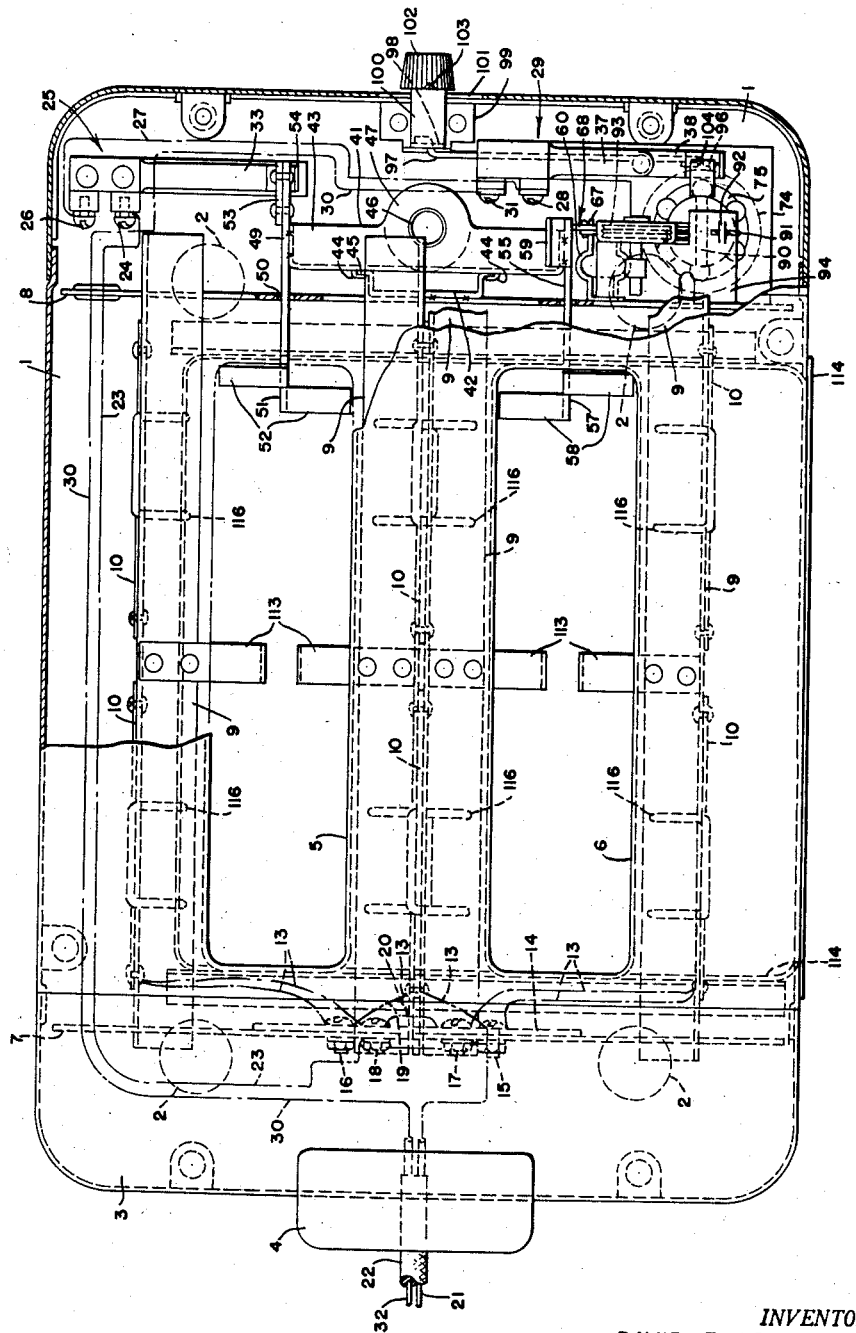
Fig. 2 is a top plan view of such broiler wherein the top wall is again partially broken to enhance the illustration.
Figure 3:
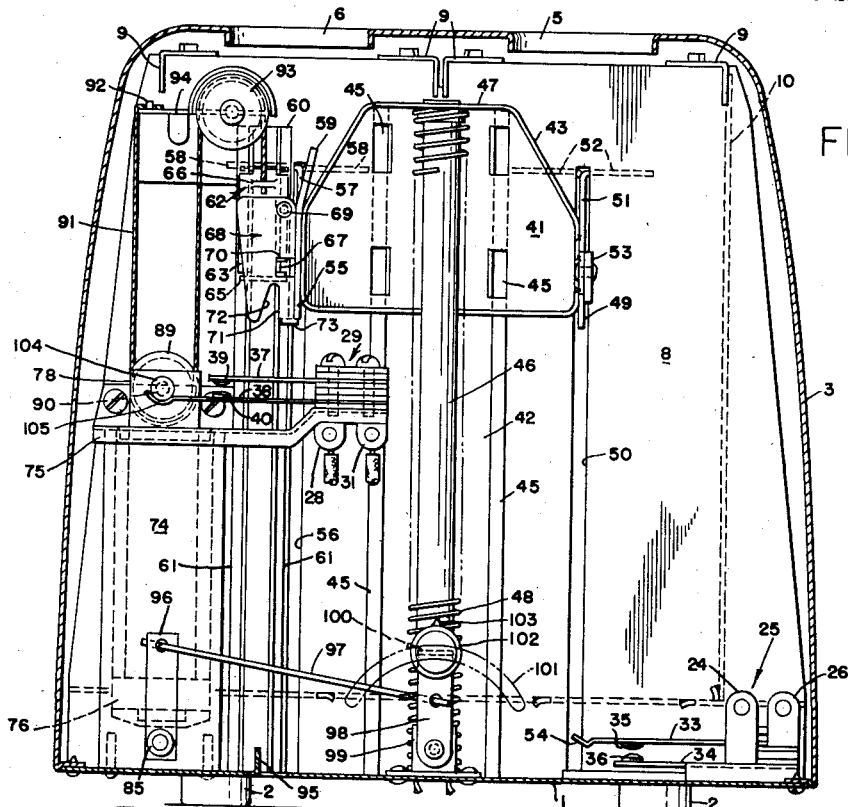
Fig. 3 is a transverse sectional view taken on the line 3—3 in Fig. 1.

Secured to the right hand side of the slide, as viewed in Fig. 3, there is an operating arm 49 which extends inwardly through a slot 50 in the wall 8, this arm thereby projecting into the right heating chamber and having therewithin a vertical extension 51 which terminates in two oppositely directed feet 52, the latter being disposed horizontally to bridge the space beneath the top slot 5 as shown in Fig. 2. Fastened to the other end of such arm, there is a trip plate 53 of insulative material operative when the slide 41 is depressed substantially to its lowermost position to engage a slightly hooked extension 54 of the top switch blade 33 of the first control switch 25, which is normally open, and to move this blade downwardly to close the switch on further lowering of the slide.

A generally similar left hand operating arm 55 is secured to the other side of the slide, this arm also extending inwardly through a slot 56 in the wall 8, having a vertical inner extension 57, and terminal feet 58 positioned in like manner with respect to the second top opening 6 of the broiler. The arm 55, however, has an upwardly inclined cam portion 59 at its other or outer end, for a purpose to be described. Both operating arms may be attached to the slide 41 in any suitable manner, for example, by spot welding to the flange 43, in order to move therewith.

Figure 4:
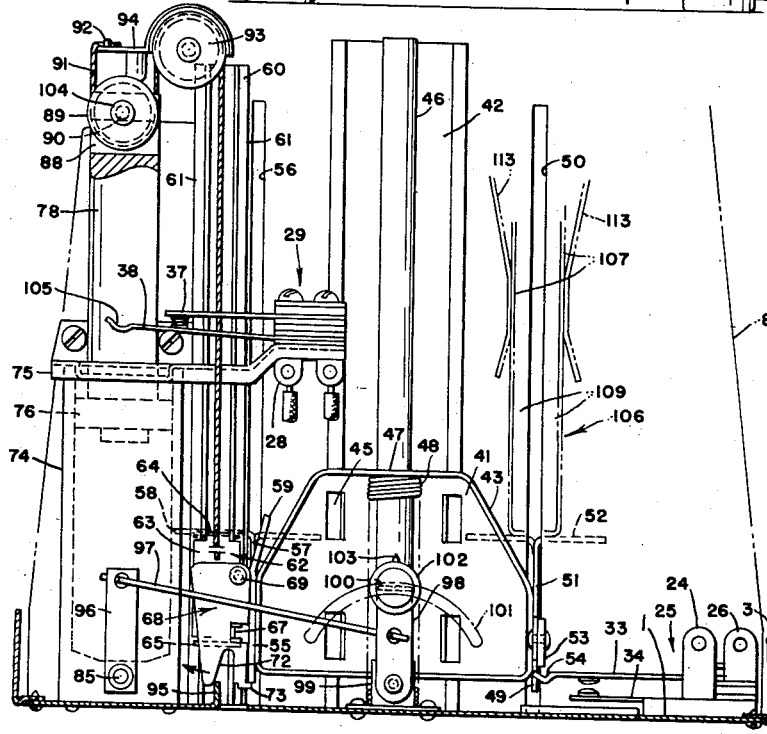
Fig. 4 is a view in elevation illustrating the timer mechanism of the broiler on an enlarged scale.

A further guide 60 of channel shape is attached to the wall 8 to extend vertically at the left of the slide 41, with its base secured to such wall and its flanges transversely rounded outwardly at an intermediate section 61, as shown most clearly in Fig. 6. A latch carrier indicated at 62 is reciprocable along this guide, the same comprising a plate 63 having rearwardly directed tabs 64 at its upper and lower ends which extend into the guide 60 and terminate in enlarged rounded holding sections 65 fitted within the enlarged section 61 of such guide. Carrier 62 has an apertured lug 66 on its front face and a stop 67 projecting outwardly near the lower end of its right margin. Such formation is most clearly shown in Fig. 8 and also shown therein is a latch 68 which is pivoted to the front face of the carrier by a pin 69 (Figs. 3 and 4). The pin 69 is located at the upper right hand corner of the latch and therefore off-set from a vertical line drawn through the center of gravity of the latch. Latch 68 accordingly tends to swing on the pin 69 by gravity in a counterclockwise direction beyond the vertically oriented position, but the stop 67 of the latch carrier engages in a notch 70 formed in the latch right edge to limit this free pivoting to such vertical condition. The lower edge of the latch has an intermediate deep notch 71, the left side 72 of which is at an angle to slope toward the upper right hand corner, and at its lower right corner, the latch is provided with a toe 73 turned inwardly and projecting laterally beyond the margin of the latch at such side. The function of the latch will be set forth hereinbelow.

A vertical cylinder 74 is fastened appropriately to the broiler base 1 alongside the latch guide 60, with its lower end being substantially closed and its upper end open and held by a support ring 75 attached to the wall 8. Reciprocable in this cylinder is a piston 76 (Fig. 5), the periphery of which is grooved as shown at 77 to reduce its area of contact with the cylinder wall, and secured thereto is a rod 78 of substantial diameter and hence mass. The piston and cylinder are made of the same metal, preferably aluminum, and high heat lubricant, such as silicone oil, may be applied to the piston to reduce friction.

Air can enter the cylinder 74 beneath the piston 76 through a hole 79 in the base 1 and a bottom orifice 80 in communication with a well or recess 81 formed in the cylinder base, a small ball 82 being provided in the bottom of the recess to operate as a check against the escape of the air through such supply orifice upon downward movement of the piston. There is a small lateral passage extending from the recess 81 to a valve seat 83 at the bottom of a tapped lateral opening 84 in which a screw threaded needle valve 85 is received and adjustable variably to open and to close the lateral passage. Leading from the inner end of the valve chamber is a discharge passage 86 extending through the cylinder base and the broiler base, the latter having a hole 87 in registry with this passage. It will be clear that downward movement of the piston forces air through the valve at a controlled rate of discharge determined by adjustment of the needle.

The piston assembly is caused to move in response to actuation of the operating slide 41, through the latch described, to control the energization of the heating elements 13, with the piston being lifted upon depression of the slide to initiate the operation and then allowed to fall freely to time the cooking period. For such purpose, the upper end of the piston rod 78 is formed with a slot 88 and in this slot a pulley 89 is mounted on a shaft 90. A metallic cable 91 extends downwardly from an end fastening 92 around this pulley, upwardly over a stationary pulley 93 mounted on a bracket 94 secured to the wall 8, and then downwardly again to the latch carrier 62, with its other end secured in the lug 66 of the same. As best shown in Figs. 3 and 4, the toe 73 of the latch engages the bottom edge of the operating arm 55 in the left side of the slide 41 in the uppermost position of the latter, whereby depression of the slide moves the latch downwardly to lift the piston through such cable connection. In the condition of the parts illustrated in Fig. 4, the slide has been lowered almost to its extreme bottom position and the latch has just been engaged by a cam finger 95 projecting upwardly from the base 1, this finger bearing against the sloping side 72 of the bottom notch. The spring 48 is compressed and as the slide continues to move to its bottom position, the stationary finger 95 cams the latch 62 about its pivot clockwise or in the direction of the arrow in Fig. 4 to withdraw the toe 73 from beneath the operating arm 55, whereby the piston assembly is now free to descend by gravity at a rate determined by the needle valve adjustment. The slide 41 is thus a movable actuator for the piston assembly.

This last adjustment is provided by a lever 96 secured to the threaded valve body 85 and a link 97 connecting such lever to a further lever 98 pivoted on a bracket 99 near the center of the adjacent broiler end wall. Lever 98 has a horizontal extension 100 projecting through the end wall in arcuate slot 101 and carries external knob 102 having a pointer 103 adapted cooperably with suitable indicia on the outer face of the end wall to indicate various settings. It will be clear that the knob may be manually shifted to oscillate the lever 98 and thereby change the discharge rate of the needle valve by threadably advancing or retracting the same. The legends provided on the end wall to indicate the various positions of adjustment may denote time intervals or degrees of cooking of the food.

The shaft 90 on which the pulley 89 carried by the piston rod is mounted has a cap 104 of insulating material on a projecting end disposed to engage in a seat 105 formed in an extension of the bottom blade 38 of the second control switch 29. This blade is normally bent upwardly so as to hold its contact 40 against the other contact 39 of the switch (Fig. 4) and the engagement of the sleeve 104 therewith and weight of the piston 78 pull the blade down to separate the contacts when the piston is lowered. It will be remembered that the two control switches are series connected, so that the piston must be elevated before the heating elements 13 of the broiler are energized. The piston and cylinder of course constitute a pneumatic timer with the weight of the piston and rod, together with the controlled escape orifice, providing the timing cycle to determine or end a cooking operation.

Start of the cycle is accomplished by depressing the operating slide 41 and, in the embodiment shown, the insertion of the meat or other food produces such actuation of the latter. In Figs. 9 to 11, I have shown a holder 106 for the meat comprising two rectangular grids 107 secured respectively to arms 108 to depend therefrom normally in close spaced opposition, such grids having inwardly directed peripheral flanges 109 and provided with elongated slots 110 over their major areas. The arms are fitted in handles 111, preferably made of plastic, which are formed for connection at their outer ends by a pivot pin 112 in the manner of a hinge. The handles are simply opened, the meat inserted between the grids, and the handles then actuated to bring the same together and thus hold the meat. Within the broiler, I provide a pair of opposed spring fingers 113 in each heating chamber adapted to engage the outer faces of the grids in the manner shown in Fig. 11 and thereby serving to prevent improper opening of the inserted holder. Insertion of the holder brings the same against the terminal feet of one or the other of the operator arms 49 or 55, depending upon which slot the holder is placed in, and the weight of the holder and its contained food is sufficient to depress the slide 41 and thus lift the piston 78. The cable and pulley arrangement facilitates this operation by providing a two-to-one mechanical advantage, whereby a relatively light load on the slide is effective to lift the fairly heavy piston and piston rod.

In a complete operation of the broiler, the needle valve 85 will first be adjusted by the knob 102 to provide the cooking time appropriate for the food to be broiled, the food will be placed in the holder 106 and the latter then inserted vertically in one or the other of the slots 5 or 6 of the broiler. The slide is thereby depressed and this motion is transmitted through the latch 68, carrier 62 and cable 91 to lift the piston, with air being drawn into the cylinder through the bottom opening 80. As soon as the piston is lifted from its normal bottom rest position, the second control switch 29 will close by virtue of the spring blade 38 moving upwardly to establish the contacts of this switch, but the heaters 13 will not then be energized, since the first control switch 25 is still open.

Just before the slide 41 reaches the bottom of its travel, the trip plate 53 engages the flexible blade 35 of the first control switch 25, whereupon the further downward movement closes this switch to complete the circuit through the parallel connected heating elements, and the same are energized. Also upon the slide reaching its lowermost position, the latch 68 is moved by its engagement with the cam 95 to free the piston rod from the slide and the piston then commences its descent at the rate controlled by the valve setting and determining the time of the cooking operation. When the piston rod approaches the bottom of the cylinder, switch 29 is opened and the heating elements are de-energized. If desired a tell-tale light (not shown) may be provided in the circuit to indicate the end of the time period or some form of audible signal can be provided for the same purpose. In any event, the cooking has been terminated automatically, with the piston now in its lowered position and the latch 68 in its elevated condition. The user lifts the holder from the broiler, removing the weight thereof from the disconnected slide 41, whereupon the spring 48 raises the slide and the cam portion 59 of the left operating arm 55 engages the now elevated latch 68 to swing the same somewhat clockwise about its pivot 69 to clear the latching toe 73; when this toe is cleared, the weight of the latch causes it to swing back to bring the toe under the slide 41. The broiler is thus in condition for a further cooking operation.

In order to collect grease and the like dripping from the food, I provide a pan 114 removably resting on the base 1 beneath the heating chambers and being withdrawable in the nature of a drawer, from a side of the broiler, for disposal of the material collected therein and cleaning of the same. I also prefer to provide a drip pan cover 115 held just above the pan 114, as shown most clearly in Fig. 1, and having downwardly sloping walls for directing falling material into the pan.

For protection of the heating elements, I also provide guard wires 116 extending vertically in outward spaced relation at the operative faces of the several such elements. If desired, two sets of spring fingers 113 may be disposed in each heating chamber, in longitudinal spaced relation, and with this arrangement, the guard wires 116 can be dispensed with since the multiple spring fingers would afford adequate protection for the heaters.

The pneumatic timer described is of such design in its weight and controllable discharge as to provide a timing range of from about three to about seven minutes.

The metal to metal contact of the piston and cylinder, with both being made of the same metal, eliminates improper or variable operation as a result of expansion with temperature rise so that the timing cycle may be repeated rapidly without variation in the set time. It will be seen that this long interval timer is of inexpensive and entirely reliable construction and is distinguished by the absence of any spring drive of the piston, so common in conventional dash-pot structure. Such operating springs not only complicate the mechanism but they constitute a source of breakage and wear and introduce a potential variable in the timing cycle.

While I have shown a construction in which the broiler has two vertical heating chambers, one or even more than two such chambers can obviously be provided if desired by minor structural changes. Where more than one chamber is provided, there will of course be a corresponding number of holders available for simultaneous use of the several heating compartments.

Other modes of applying the principle of the invention may be employed, change being made as regards the details described, provided the features stated in any of the following claims or the equivalent of such be employed.

I, therefore, particularly point out and distinctly claim as my invention:

1. A cooking appliance comprising a housing having a food-receiving compartment therein, heating means arranged and operative in said housing to heat food in such compartment, means for initiating operation of said heating means, a vertical cylinder in said housing, a piston assembly reciprocable in said cylinder, unidirectional valve means in a lower portion of the cylinder for admitting air thereto beneath the piston assembly, adjustable discharge valve means likewise in a lower portion of the cylinder for escape of the air therefrom, said piston assembly being freely liftable in the cylinder and returnable to its lowered condition by gravity at a rate determined by adjustment of said discharge valve means, means for lifting the piston assembly in response to insertion of the food in the compartment and releasing the same when lifted a predetermined distance, and means for terminating operation of said heating means in response to such return of the piston assembly to provide an automatic time control for the cooking of the food.

2. A cooking appliance comprising a housing having a food-receiving compartment therein, heating means arranged and operative in said housing to heat food in such compartment, means for initiating operation of said heating means, a vertical cylinder in said housing, a piston assembly reciprocable in said cylinder, unidirectional valve means in a lower portion of the cylinder for admitting air thereto beneath the piston assembly, adjustable discharge valve means likewise in a lower portion of the cylinder for escape of the air therefrom, said piston assembly being freely liftable in the cylinder and returnable to its lowered condition by gravity at a rate determined by adjustment of said discharge valve means, a movable actuator, means releasably connecting said actuator and the piston assembly to lift the latter in response to movement of the former, trip means for releasing the piston assembly from said actuator after lifting of the same to a predetermined elevation, whereupon the piston assembly is free to descend in the cylinder, and means for terminating operation of said heating means in response to such return of the piston assembly to provide an automatic time control for the cooking of the food.

3. An electric broiler comprising a housing having a vertical heating compartment access to which is provided by a slot in the top of the housing, electric heating elements arranged respectively at the sides of such compartment, an operating slide in said housing adapted to be depressed when food is inserted in such compartment, a pneumatic timer including a piston operative to descend in a cylinder by gravity and being retarded in such movement by restriction of the discharge of air from such cylinder, means including a latch for connecting the piston to the slide so that depression of the latter is effective to lift the former, trip means operative to actuate said latch to disable the connection between the slide and piston after the piston has been withdrawn a predetermined extent, and control means for said heating elements actuated in response to movement of the piston for timing the energization of such elements.

4. An electric broiler comprising a housing having a vertical heating compartment access to which is provided by a slot in the top of the housing, electric heating elements arranged respectively at the sides of such compartment, an operating slide in said housing adapted to be depressed when food is inserted in such compartment, a pneumatic timer including a piston operative to descend in a cylinder by gravity and being retarded in such movement by restriction of the discharge of air from such cylinder, means for releasably connecting said slide and piston so that depression of the former raises the latter, means for disabling such connection after the piston has been raised a predetermined extent to permit the piston to descend, switch means in circuit with said heating elements and held open by the presence of the piston in its lowered rest position, and further switch means in series connection with said switch means, said further switch means being normally open and closed by depression of said slide.

5. An electric broiler comprising a housing having a vertical heating compartment access to which is provided by a slot in the top of the housing, electric heating elements arranged respectively at the sides of such compartment, a vertical cylinder in the housing having an air inlet and outlet in the bottom portion thereof, means for adjustably restricting the discharge of the air through such outlet, a piston in said cylinder operative to descend therein by gravity at a rate determined by such adjustment of the air discharge, a holder for the food to be cooked adapted to be inserted through the housing slot into such heating compartment, an operating slide having a portion which extends into such compartment to be engaged and depressed by such holder in such insertion of the same, spring means normally holding the slide in an elevated condition, a cable connecting said slide and piston and being trained about pulleys such that downward force on the slide is multiplied and applied to lift the piston, the connection of said cable including latch means, trip means for actuating the latch means to disable such connection after the piston has been elevated by the slide to a predetermined point, and circuit control means for timing energization of said heating elements in accordance with the descent of the piston.

6. An electric broiler comprising a housing having a vertical heating compartment access to which is provided by a slot in the top of the housing, electric heating elements arranged respectively at the sides of such compartment, a holder for the food to be cooked adapted to be inserted and supported in such compartment, a pneumatic timer including a piston which is displaced from a normal rest position to condition the timer for operation, first switch means held open by the presence of the piston in its rest position and closing upon displacement thereof from such position, second normally open switch means actuated to closed condition in response to substantially complete insertion of the holder in the compartment, and operator means for displacing the piston in response to and during insertion of the holder, said first and second switch means being in series connection with said heating elements to control energization thereof.

7. An electric broiler comprising a housing having a vertical heating compartment access to which is provided by a slot in the top of the housing, electric heating elements arranged respectively at the sides of such compartment, a holder for the food to be cooked having two hinged grids and being removably supported in such compartment, spring fingers in the compartment arranged to bear respectively against the outer surfaces of said grids resiliently to urge the two together, pneumatic timing means for controlling energization of said heating elements, and holder actuated switch means operative to interrupt the energization upon withdrawal of the holder from the compartment regardless of the condition of said timing means.

8. A cooking appliance comprising a housing having a food-receiving compartment therein, heating means arranged and operative in said housing to heat food in such compartment, means for initiating operation of said heating means, a vertical cylinder in said housing, a piston reciprocable in said cylinder and having its outer periphery engaged with the inner surface of the cylinder, said cylinder and piston being formed from the same material, an orifice at the bottom of the cylinder to admit and exhaust air to and from the same beneath the piston, a piston rod of substantial diameter and mass secured to and extending upwardly from the piston, the piston and piston rod being freely liftable in the cylinder and descending therein by gravity at a rate determined by the discharge of the air therebeneath through said orifice, and switch means actuated in response to such lifting and return of the piston for controlling operation of said heating means.

9. The combination set forth in claim 8 characterized further in that the periphery of the piston is relieved by grooves to reduce the area of contact between the same and the inner surface of the cylinder.

10. A cooking appliance comprising a housing having a food-receiving compartment therein, heating means arranged and operative in said housing to heat food in such compartment, means for initiating operation of said heating means, a vertical cylinder in said housing, a piston reciprocable in said cylinder and having its outer periphery engaged with the inner surface of the cylinder, an orifice at the bottom of the cylinder to admit and exhaust air to and from the same beneath the piston, a piston rod of substantial diameter and mass secured to and extending upwardly from the piston, a movable actuator, connector means extending from said actuator to the piston rod for lifting the latter in response to movement of the actuator, said connector means including pulleys and an elongated flexible member trained about the same in such arrangement as to provide a mechanical advantage in such lifting by the actuator, the piston and piston rod being returnable to the lowered condition thereof by gravity at a rate determined by discharge of the air beneath the piston through said orifice, and switch means actuated in response to such lifting and return of the piston and piston rod for controlling operation of said heating means.

11. An electric broiler comprising a housing having a vertical heating compartment access to which is provided by a slot in the top of the housing, electric heating elements arranged respectively at the sides of such compartment, pneumatic timing means including a vertical cylinder and a piston therein which is raised from a normal position to condition the timer and descends by gravity, and an electric circuit for controlling energization of the heating elements, said circuit including a switch actuated in response to movement of said piston to close upon lifting of the same from its lower rest position and to open when the piston returns by gravity to such position, such actuation of the switch thereby providing a time-controlled heating cycle of operation, and normally closed circuit control means opened in response to the presence of food in the heating compartment, the timer-actuated switch and said control means being operative in series in said circuit, whereby energization of the heating elements depends on both timer actuation and food presence and will be interrupted in the event of food withdrawal prior to completion of the operating cycle of the timing means.

12. An electric broiler comprising a housing having a vertical heating compartment access to which is provided by a slot in the top of the housing, electric heating elements arranged in parallel planes respectively at the sides of such compartment, a holder for the food to be cooked comprising two generally rectangular laterally spaced grids for engaging opposite sides of the food, a pair of support rods secured respectively along the top edges of said grids and extending beyond the side edges thereof, said rods being of longer length than the housing slot and disposed with their end portions resting on the top of the housing adjacent the ends of such slot, with said grids depending from the rods into the heating compartment, hingedly connected handle portions interconnecting corresponding ends of the rods for manipulating the same, said rods and grids being otherwise free of interconnection to permit opening of the holder, and spring members at the sides of the heating compartment protruding inwardly into resiliently deformed engagement with the outer faces of the grids thereby to force the same together against food placed therebetween.

References Cited in the file of this patent

UNITED STATES PATENTS

| | | |
|---|---|---|
| 1,996,297 | Langenfold | Apr. 2, 1935 |
| 2,046,472 | Lavenberg | July 7, 1936 |
| 2,091,041 | Hallwood | Aug. 24, 1937 |
| 2,559,801 | Sarchet | July 10, 1951 |
| 2,607,286 | Krissel | Aug. 19, 1952 |

FOREIGN PATENTS

| | | |
|---|---|---|
| 657,350 | Great Britain | Sept. 19, 1951 |